United States Patent [19]

Moehle

[11] Patent Number: 5,145,149
[45] Date of Patent: Sep. 8, 1992

[54] FORM-FITTING CONNECTION OF A MAGNET VALVE TO A HOUSING BLOCK

[75] Inventor: Martin Moehle, Steinheim, Fed. Rep. of Germany

[73] Assignee: Robert Bosch GmbH, Stuttgart, Fed. Rep. of Germany

[21] Appl. No.: 828,611

[22] Filed: Jan. 31, 1992

[30] Foreign Application Priority Data

Feb. 16, 1991 [DE] Fed. Rep. of Germany ....... 4104804

[51] Int. Cl.⁵ .............................................. F16K 31/06
[52] U.S. Cl. ............................... 251/129.15; 335/278; 335/202
[58] Field of Search .................... 251/129.15; 335/278, 335/202

[56] References Cited

U.S. PATENT DOCUMENTS

| | | |
|---|---|---|
| 3,462,116 | 8/1969 | Wright, Jr. ..................... 335/278 X |
| 4,783,049 | 11/1988 | Northman et al. ............. 251/129.15 |
| 4,988,074 | 1/1991 | Najmolhoda ................... 251/129.15 |

FOREIGN PATENT DOCUMENTS 3810581 10/1989 Fed. Rep. of Germany .
2131906  6/1984 United Kingdom .

*Primary Examiner*—Arnold Rosenthal
*Attorney, Agent, or Firm*—Edwin E. Greigg; Ronald E. Greigg

[57] ABSTRACT

This invention is directed to a connection between a magnet valve and a housing block. The housing block has a receiving bore, which as the bore depth increases changes the bore into an undercut. A valve body portion has a shape adapted to the undercut, leaving open a continuous encompassing gap of constant width with respect to the undercut. A housing jacket that fits over the coil of the magnet valve is press-fitted into the gap. The jacket is longitudinally slit to form tongues whose ends undergo deformation in the undercut. The form-fitting connection is usable for instance in the hydraulic unit of anti-lock vehicle brake systems.

6 Claims, 1 Drawing Sheet

FORM-FITTING CONNECTION OF A MAGNET VALVE TO A HOUSING BLOCK

BACKGROUND OF THE INVENTION

The invention is based on a form-fitting connection of a magnet valve to a housing block as defined hereinafter.

A connection of this kind has already been proposed (German Patent Application P 40 13 876.3), in which a sleeve serves as the connecting means between the housing block and the valve body portion engaging a receiving bore that undercuts the housing block. The sleeve is slipped over the housing jacket of the magnet valve and pressed into a fitting gap between the valve body portion and the receiving bore of the housing block. The sleeve undergoes flaring in the receiving bore undercut, producing a form-fitting connection between the magnet valve and the housing block.

OBJECT AND SUMMARY OF THE INVENTION

The form-fitting connection according to the invention has an advantage over the prior art that the effort for producing this connection is reduced still further because the housing jacket of the magnet valve not only houses the magnet valve but also acts as the sleeve. The axial strain on the housing jacket during the press-fit process is relatively slight, because the tongues formed by the slits predominantly undergo bending inside the undercut.

The embodiment of the housing jacket is especially favorable, because it not only facilitates the press-fit process, but also lowers magnetic losses from eddy currents during operation of the magnet valve.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
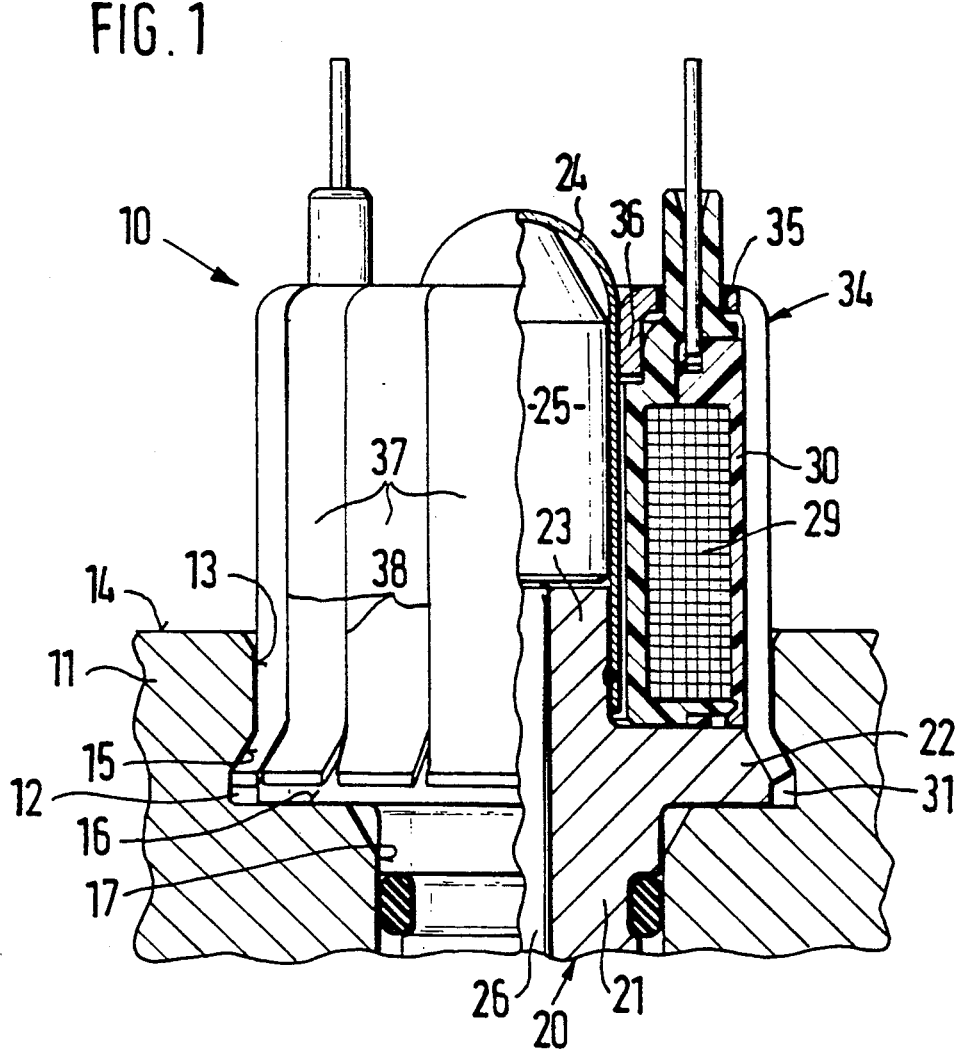
FIG. 1 is a view in half-section of a magnet valve, secured by its longitudinally slit housing jacket in a housing block.

The exemplary embodiment of a form-fitting connection shown in the drawing in FIG. 1 has a magnet valve 10, which is intended for use in a hydraulic anti-lock vehicle brake system, not shown.

The magnet valve 10 is secured in a housing block 11. This housing block 11 has a receiving bore 12, which with a cylindrical bore segment 13 begins at an end face 14 of the housing block. Bordering this cylindrical bore segment 13, the receiving bore 12 changes as the bore depth increases in to an undercut 15, in other words, a radial expansion of the bore 12. The undercut 15 has a conical shape with a cone angle of about 30°. The undercut 15 is defined by a radially extending bore step 16, from which the receiving bore 12 continues in the form of a bore segment 17 of smaller diameter.

The magnet valve 10 has a rotationally symmetrical valve body 20 with a first cylindrical projection 21 which fittingly engages the bore segment 17. Bordering on the cylindrical projection 21, the valve body 20 has a flange-like portion 22 adapted circumferentially to the cross section of the undercut 15. The valve body portion 22 has a smaller diameter than the cylindrical bore segment 13. The valve body portion 22 is adjoined by a second cylindrical projection 23, remote from the first projection 21, of the valve body 20. A coaxially extending armature guide sleeve 24 is secured to the projection 23. This sleeve receives an armature 25 of the magnet valve 10 that cooperates with a tappet 26 penetrating the valve body 20 for actuating a seat valve, not shown.

The armature guide sleeve 24 and the cylindrical projection 23 are circumferentially engaged by a coil 29 supported on the flange-like valve body portion 22. The coil, provided with an insulating plastic sheath 30, and the flange-like valve body portion 22, in cooperation with the cylindrical bore segment 13 and the undercut 15 of the receiving bore 21, form a gap 31, preferably of constant width.

The magnet valve 10 also has a cup-shaped hollow-cylindrical housing jacket 34 that fits over the coil 29. The housing jacket 34, made of magnetic steel sheets, has a bottom 35 that extends along the face end of the coil 29 remote from the flange-like valve body portion 22. An axially oriented indentation 36 with which the housing jacket 34 is centered on the armature guide sleeve 24 begins at the radially extending bottom 35. On its circumference, the housing jacket 35 comprises a plurality of axially extending, parallel-defined tongues 37 of equal width. The tongues 37 are separated in gap-free fashion from one another by slits that begin at the bottom 35 and extend over the entire length of the housing jacket 34. The housing jacket 34 fittingly engages the gap 31 with its tongues 37, the thickness of the sheet metal of which is equivalent to the width of the gap 31. The tongues 37 are bent outward in the region of the undercut 15. This deformation of the tongues 37 in the gap 31 produces a radially and axially acting form-fitting connection of the magnet valve 10 to the housing block 11.

Figure 2:
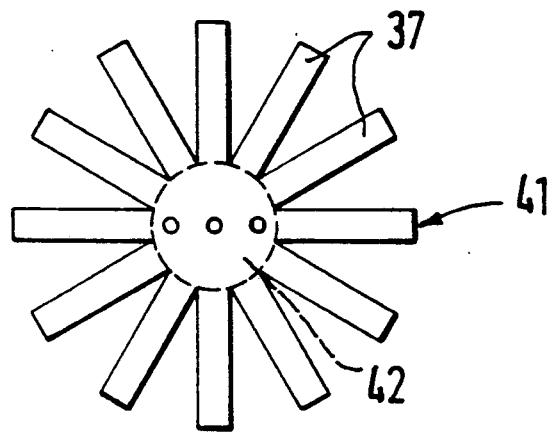
FIG. 2 is a plan view on a sheet-metal blank for producing the housing jacket, on a different scale from FIG. 1.

The housing jacket 34 is formed of a flat sheet-metal blank 41 (FIG. 2). The sheet-metal blank 41 has a circular center 42, from which the bottom 35 and the indentation 3 of the housing jacket 34 can be made. The tongues 37 disposed with uniform distribution over the circumference of the housing jacket 34 begin at the center 42 which in the drawing is outlined by a circle of dashed lines. The parallel-defined tongues 37 are bent at a right angle to the plane of the center 42, so that they come to rest with their narrow ends on one another and form a hollow-cylindrical component. The completed housing jacket 34 is mounted as follows:

After the mounting of the coil 29, the magnet valve 10 is inserted into the receiving bore 12, so that the flange-like valve body portion 22 engages the bore step 16. Next, the housing jacket 34, with the tongues 37 assuming their extended shape, is slipped over the coil 29. With a press-fit tool, not shown, that engages the bottom 35 the housing jacket 34 is pressed into the gap 31. As the tongues 37 press into the undercut 15, they undergo deformation; that is, the free end portion of each of the tongues 37 is bent outward into the undercut 15 of the housing block 11. The form-fitting connection between the magnet valve 10 and the housing block 11 is complete.

In a modification of the exemplary embodiment described, the housing jacket 34 may instead comprise a cup-shaped deep-drawn part which is provided with axially extending slits 38 only in the region of the undercut 15.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the United States is:

1. A form-fitting connection of a magnet valve (10) that has a housing jacket (34) fitting over a coil (29), having a housing block (11) with a receiving bore (12) for a valve body portion (22) fixed axially and radially in it, said housing block (11) includes a cylindrical bore segment (13) that extends to the receiving bore (12) which changes into an undercut (15) as the bore depth increases and a shoulder (16) that extends radially to a smaller diameter bore (17), the valve body portion (22) has a shape adapted to be received in the receiving bore (12) with the undercut (15), leaving open an encompassing gap (31) of constant width with respect to the undercut;

an approximately hollow-cylindrical component is pressed into said encompassing gap filling the gap (31) between the receiving bore (12) and the valve body portion (22) and engaging the region of the undercut (15);

the hollow-cylindrical component is embodied by the housing jacket (34) of the magnet valve (10); and the housing jacket (34) is provided, in the region of the undercut (15), with at least approximately axially extending slits (38).

2. A form-fitting connection as defined by claim 1, in which the slits (38) are distributed uniformly over the circumference of the housing jacket (34).

3. A form-fitting connection as defined by claim 1, having an approximately cup-shaped housing jacket (34) fitting by its bottom (35) over the coil (29), in which the housing jacket (34) is provided with the slits (38) extending as far as its bottom (35).

4. A form-fitting connection as defined by claim 2, having an approximately cup-shaped housing jacket (34) fitting by its bottom (35) over the coil (29), in which the housing jacket (34) is provided with the slits (38) extending as far as its bottom (35).

5. A form-fitting connection as defined by claim 3, in which the housing jacket (34) is formed of a flat sheet-metal blank (41) having parallel-defined tongues (37) that begin radially at a circular center (42) and are bent at a right angle to the plane of the center (42) forming the bottom.

6. A form-fitting connection as defined by claim 4, in which the housing jacket (34) is formed of a flat sheet-metal blank (41) having parallel-defined tongues (37) that begin radially at a circular center (42) and are bent at a right angle to the plane of the center (42) forming the bottom.

* * * * *